United States Patent [19]

Olschewski et al.

[11] 4,377,313

[45] Mar. 22, 1983

[54] THIN-WALLED BEARING BUSHINGS PRODUCED IN THE DRAWING PROCESS

[75] Inventors: Armin Olschewski, Schweinfurt; Hermann Hetterich, Heidenfeld; Peter Horling, Mainberg, all of Fed. Rep. of Germany

[73] Assignee: SKF Kugellagerfabriken GmbH, Schweinfurt, Fed. Rep. of Germany

[21] Appl. No.: 218,520

[22] Filed: Dec. 22, 1980

[30] Foreign Application Priority Data

Dec. 22, 1979 [DE] Fed. Rep. of Germany ....... 2952092

[51] Int. Cl.$^3$ .............................................. F16D 3/24
[52] U.S. Cl. ..................................... 308/216; 464/128
[58] Field of Search .......... 308/178, 212, 216, 237 R, 308/207 R; 64/17 A, 17 R; 464/128

[56] References Cited

U.S. PATENT DOCUMENTS

| | | | |
|---|---|---|---|
| 2,384,444 | 9/1945 | Cravener, Jr. et al. | 29/148.4 |
| 2,794,693 | 6/1957 | Burkhalter et al. | 308/212 |
| 3,760,751 | 9/1973 | Dunn et al. | 113/120 H |
| 3,920,296 | 11/1975 | Eckhardt | 308/212 |
| 4,050,130 | 9/1977 | Pitner | 64/17 A X |
| 4,067,626 | 1/1978 | McElwain | 308/216 X |
| 4,154,065 | 5/1979 | Diffenderfer | 64/17 A |
| 4,154,490 | 5/1979 | Kohler et al. | 64/17 A X |
| 4,167,859 | 9/1979 | Okuda | 64/17 A X |

Primary Examiner—John Petrakes
Assistant Examiner—Daniel P. Stodola
Attorney, Agent, or Firm—Eugene E. Renz, Jr.

[57] ABSTRACT

Thin-walled bearing bushing produced in a drawing process for the support of pins in universal joints, consisting of a cylindrical sleeve section and a bottom section which closes this cylindrical sleeve section on one axial end whereby a peripheral rim with a small cross sectional radius is formed between the outside surface of the sleeve section and the outside surface of the bottom section, characterized in that a recess (9, 18, 22) is provided in one surface of the bottom section (6) radially inward of the peripheral rim (7) and axially impressed in said one surface.

4 Claims, 6 Drawing Figures

THIN-WALLED BEARING BUSHINGS PRODUCED IN THE DRAWING PROCESS

BACKGROUND AND SUMMARY OF THE INVENTION

The present invention relates to thin-walled bearing bushings produced by a drawing process particularly adapted for the support pins in universal joints. The bearing bushing consists of a cylindrical sleeve section and a bottom section which closes the cylindrical sleeve section on one axial end whereby a peripheral rim with a relatively small cross sectional radius "r" is formed between the outer peripheral surface of the sleeve section and the outer face of the bottom section.

Bearing bushings are known which have an indentation axially drawn inward in the center of its bottom section which is radially expanded outward in order to form a sharp peripheral rim between the outside surface of the sleeve section and the outside surface of the bore section. A bearing bushing of this type is shown in German Patent application disclosure No. 15 75 502. Since the wall of this known bearing bushing is constructed so that it is offset in the area of the rim, it tends to bend and harmful buckling occurs producing non-uniform material flow during expansion and drawing of the bushing. The construction material is thereby compressed non-uniformly during drawing and expanding of the bearing bushing especially in the area of the peripheral rim so that small cracks are formed in that area which can produce harmful fatigue fissures in operation when using these known bearing bushings, for example, in universal joints. A problem with these prior known bearing bushings, therefore, is that they have a somewhat limited useful life.

In accordance with the present invention, there is provided a thin-walled bearing bushing produced by a drawing process which consists of a cylindrical sleeve section and a bottom section which closes the cylindrical sleeve section on one axial end producing a peripheral rim with a small cross section radius between the outer peripheral surface of the sleeve section and the outer face of the bottom section. The bushing thus produced is formed with a recess radially inwardly which is axially impressed in the outer or inner face of the bottom section near the peripheral rim. A bearing bushing with this construction has a particularly high fatigue strength in spite of the fact that the peripheral rims have a relatively small cross section radius between the sleeve section and the bottom section. Another advantage of this construction is that it can be produced rather economically. Specifically the bushing can be produced by utilizing a drawing ram positioned in the bore and on the inside surface of the bearing bushing. The recess defined inwardly compressed in the outside or inner face of the bottom section is axially pressed with a correspondingly shaped counter ram so that relatively low pressures are needed and the wall of the bearing bushing is formed uniformly without buckling at the periphery.

In accordance with another characteristic or feature of the present invention, the cross sectional radius of the fillet is larger than the cross sectional radius of the peripheral rim so that the construction material of the recess which is radially displaced outward by the counter ram is uniformly and gradually deflected and stretched into the sleeve section. This can be attained according to a further feature of the invention by reason of the fact that the transition of the inside surface of the bottom section to the bore surface of the sleeve section is shaped as a beveled annular surface. The beveled section of the drawing ram which forms this beveled annular surface provides an arrangement wherein the displaced material is pressed into the recess in the counter ram which forms the peripheral rim.

In summary, therefore, a bearing bushing in accordance with the present invention can be produced without harmful buckling or distortion of the wall in a very economical, simple drawing process. The construction material in the area of the rim is uniformly compressed so that an advantageous fatigue strength of the bearing bushing is obtained which also produces a long useful life in supports for highly stressed pins of universal joints. The fatigue strength is further increased by reason of the fact that the recess near the peripheral rim acts as a relief recess for the transmission of axial forces which reduce harmful stress concentration in the area of the peripheral rim of the bearing bushing.

BRIEF DESCRIPTION OF THE DRAWINGS

These and other objects of the present invention and features and details of the operation and construction thereof are hereinafter more fully set forth with reference to the accompanying drawings, wherein.

DESCRIPTION OF THE PREFERRED EMBODIMENTS

Figure 1:
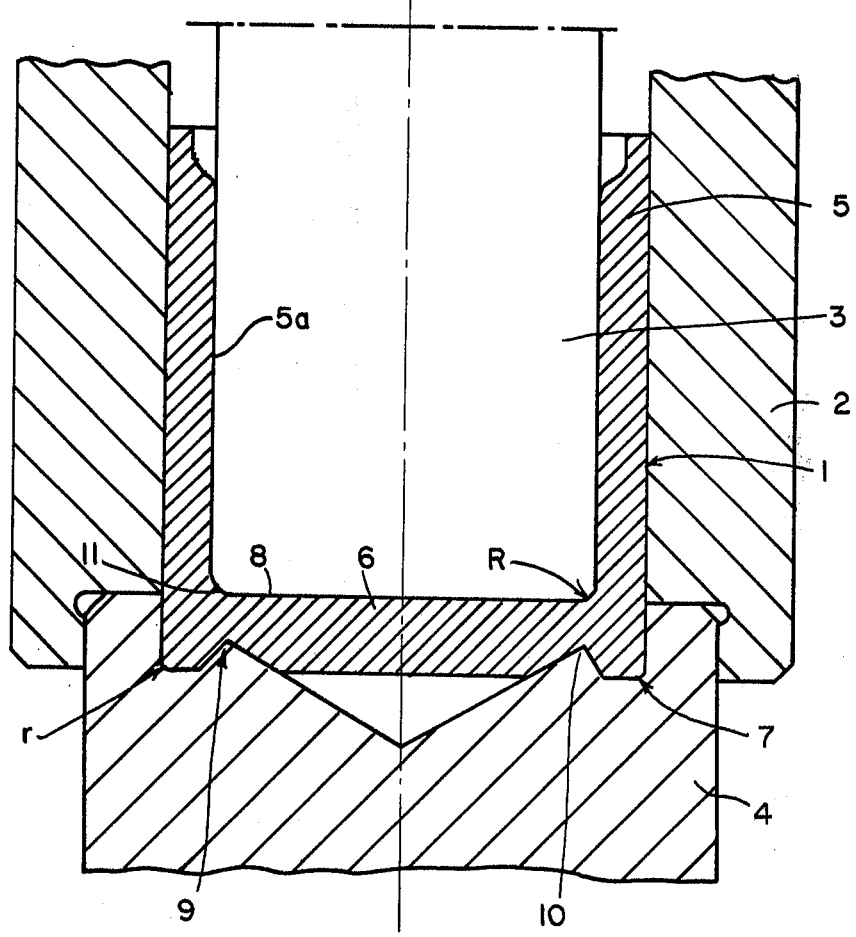
FIG. 1 is a longitudinal cross sectional view through a bearing bushing in accordance with the present invention in the drawing die.

Referring now to the drawings and particularly to FIG. 1 thereof, there is illustrated a thin-walled bearing bushing in accordance with the present invention generally designated by the numeral 1. The bushing rests in the bore of a die 2 and is produced by the drawing ram 3 and counter ram 4 in a drawing process starting from a strip-like construction material, for example, strip steel for deep drawing. The bearing bushing 1 consists of a cylindrical sleeve section 5 and a bottom section 6 which closes the cylindrical sleeve section at one axial end thereof. An exterior peripheral circumferentially extending rim 7 with a small cross sectional radius "r" is formed at the juncture of the outer surface of the sleeve section 5 and the outer surface of the bottom section 6. The inner face 8 of the bottom section 6 is a flat planar surface. A circumferentially extending fillet with a cross sectional radius "R" is formed in the transition of the inside surface inner face 8 to the cylindrical bore surface 5a of the sleeve section 5. The cross section radius "R" of the fillet is preferably larger than the cross sectional radius "r" of the peripheral rim 7.

The bushing further includes an annular groove formed, in the present instance, near the peripheral rim 7 as a radially inwardly defined, axially impressed recess 9 on the outer face of the bottom section 6 and is spaced radially inwardly from the peripheral rim 7 and generally axially aligned with the fillet. As illustrated in FIG. 1, the annular recess 9 is axially impressed and formed in the outside surface of the bottom section by a circular projection 10 of the counter ram in the die 2. In this press forming or punch forming process, the construction material of the bottom section 6 is radially displaced outwardly toward the peripheral rim 7 with the small cross sectional radius "r". The projection 10 simultaneously presses the construction material against the rim section 11 of the drawing ram 3 so that an accurately dimensioned fillet with a cross sectional radius "r" is formed on the bearing bushing 1. The construction material is at the same time uniformly compressed in the area of the peripheral rim 7.

Figure 2:
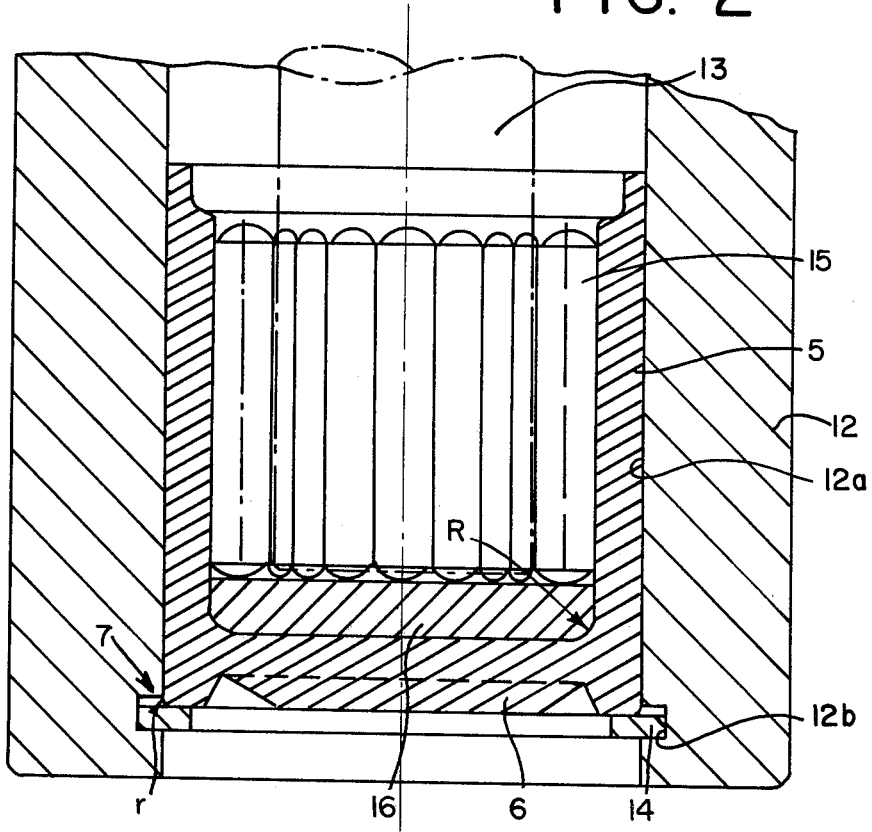
FIG. 2 is a longitudinal cross sectional view through the bearing bushing of FIG. 1 in an assembled position.

The bearing bushing 1 is illustrated in a typical universal joint in an assembled position in FIG. 2 wherein it rests in the bore 12a of the fork of the universal joint. The bearing bushing, therefore, is used as a support for the pin 13 of the universal joint. The bearing bushing 1 is axially held in place at the bottom section by a snap ring 14 engaging in an annular groove 12b in the bore of the fork 12. A plurality of roller bodies 15 are installed between the cylindrical bore surface of the sleeve section 5 and the pin 13 to rotatably support the pin 13 and the bearing bushing 1. Roller bodies 15 are axially guided via a thrust washer 16 in the bearing bushing 1.

The assembly shown in FIG. 2 illustrates that the peripheral rim 7 has a cross sectional radius "r" so that the bearing bushing 1 touches the snap ring at the periphery between the rim 7 and the recess 9 in the immediate vicinity of the bore of the fork 12. Thus, when transmitting axial forces which occur in universal joints, the force transmission takes place from the bearing bushing to the fork 12 via the snap ring 14. The snap ring 14 is then essentially stressed in shear and not in bending so that the bearing bushing 1 is firmly and unyieldingly held in place by the snap ring 14. Moreover, the construction material of the bearing bushing has a uniformly compressed structure in the area of the peripheral rim 7 so that high fatigue strength of the bearing bushing is attained.

Figure 3:
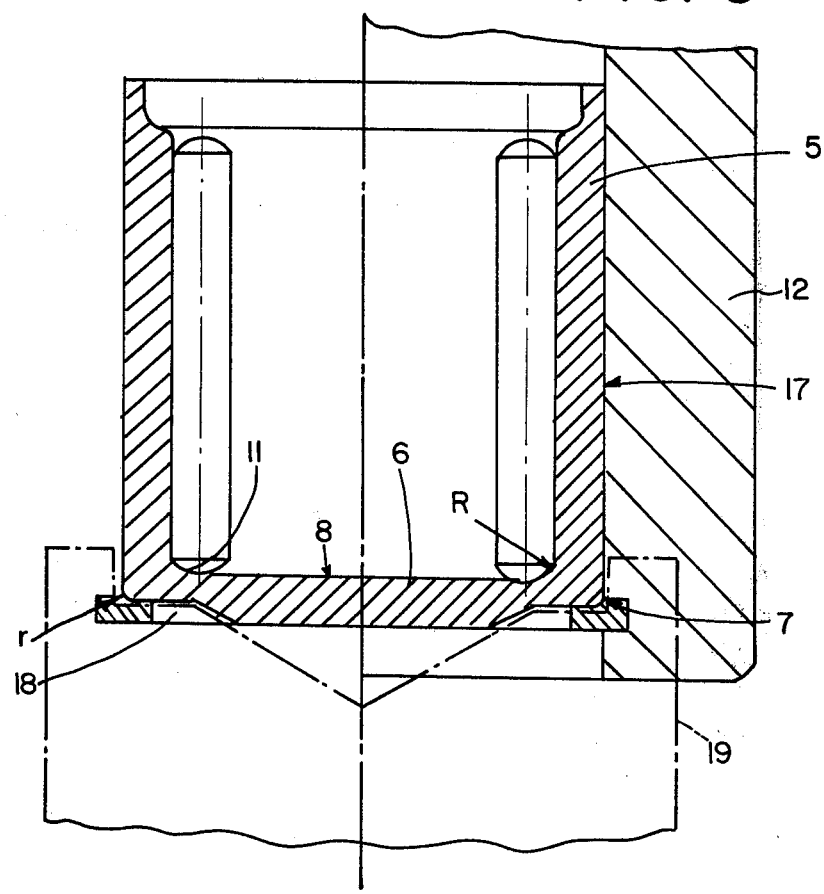
FIG. 3 is a longitudinal cross sectional view through a modified bearing bushing in the assembled position.

There is illustrated in FIG. 3 a modified bearing bushing 17 in accordance with the present invention which also is supported in the bore 12a of the fork 12 of the universal joint (not shown). The bearing bushing 17 is generally similar in construction to the bearing bushing 1 of the above described embodiment shown in FIGS. 1 and 2. It is held axially in place in the bore 12a of the fork 12 by a snap ring 14. Cylindrical roller bodies 15 which are laterally guided in this instance on the inside surface 8 which is formed as a flat surface of the bottom section 6 run on the bore surface of the sleeve section 5.

In the modified bearing bushing 17, the recess defined radially inwardly in the outside surface of the bottom section 6 is formed by a circumferentially extending annular step 18. Based on this step 18, the construction material in the transition area from the bottom section 6 to the sleeve section 5 is accurately dimensioned and uniformly compressed. The counter ram 19 (shown in dotted lines in FIG. 3) which forms the outside surface of the bottom section 6 axially presses the step 18 into the outside surface of the bottom section 6. An annular step 18 with an accurately dimensioned stepped cross section is formed near the peripheral rim 7 in this fashion since the construction material is displaced in the direction of the peripheral rim 7 in order to form a relatively small cross sectional radius "r". A fillet is formed at the same time between the inside surface 8 of the bottom section 6 and the cylindrical bore surface of the sleeve section 5 which has a cross section radius "R" which is preferably larger than the cross sectional radius of the peripheral rim 7.

Figure 4:
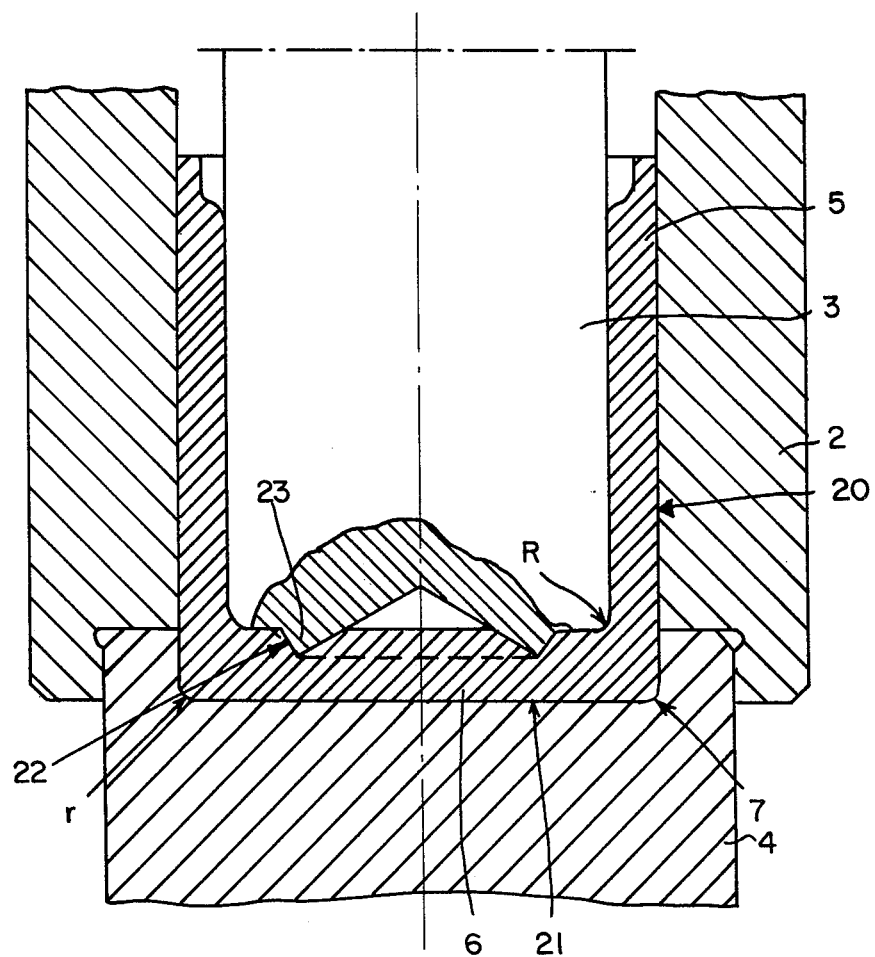
FIG. 4 is a longitudinal cross sectional view through still another modification of a bearing bushing in accordance with the present invention in the drawing die.

Another modified bearing bushing 20 in accordance with the present invention is illustrated in FIG. 4 which is supported in the die 2 and is deep drawn by the drawing ram 3 and the counter ram 4 starting from a strip steel material. The bearing bushing 20 comprises as in the previously described embodiment a cylindrical sleeve section 5 and a bottom section 6 which closes the cylindrical sleeve section at one axial end thereof. A peripheral rim 7 with a small cross sectional radius "r" is formed between the outside surface of the sleeve section 5 and the outer peripheral surface 21 of the bottom section 6.

In the present instance, a circumferentially extending annular groove 22, in the present instance, of V-shaped cross section is axially impressed on the inner face of the bottom section 6 as a radially inwardly defined recess spaced radially inwardly from the peripheral rim 7. This groove 22 is formed by a circular projection 23 on the axial front face of the drawing ram 3 so that the construction material of the bottom section is displaced radially outwardly toward the peripheral rim 7 and forms the small cross sectional radius "r" at that location. An accurately dimensioned fillet with preferably a larger radius "R" is formed by the drawing ram 3 simultaneously with the formation of the annular groove 22. By reason of the larger radius "R", the construction material radially displaced outwardly is deflected gradually in the direction of the sleeve section 5 so that harmful crack formations do not occur during the drawing operation.

The outer face 21 of the bottom section which is located axially opposite the inside surface of the bottom section 6 with the groove 22 defined therein is constructed in the present case as a flat planar surface so that non-uniform buckling or crushing forces are not effective during drawing of the bearing bushing 5 which can distort and locally overstress the bearing bushing.

Figure 5:
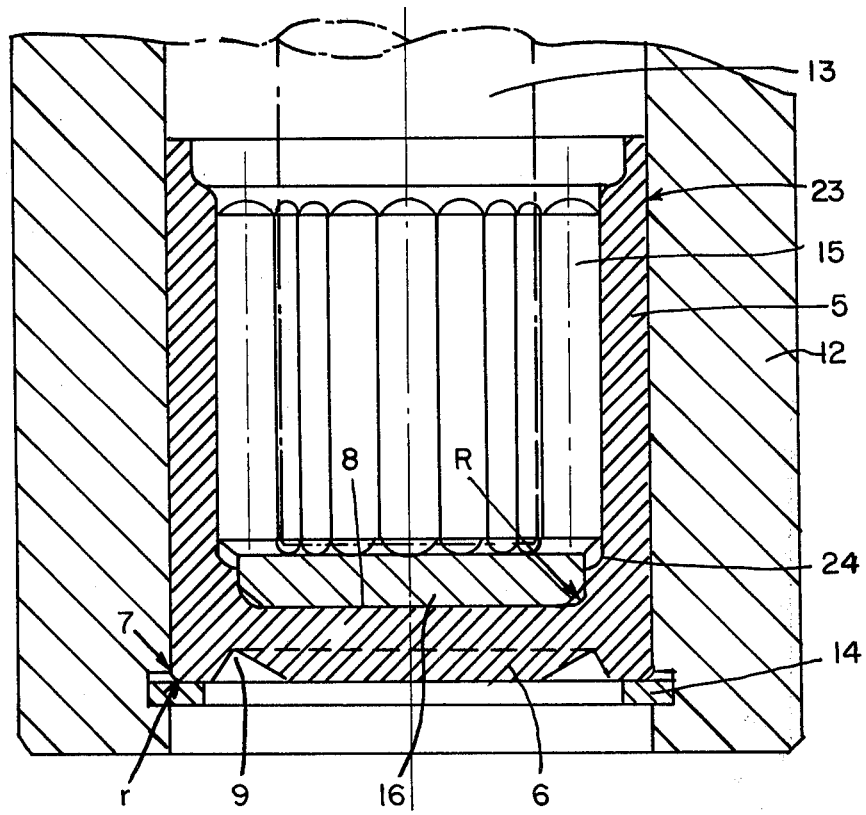
FIG. 5 is a similar longitudinal cross sectional view through a further modified bearing bushing in the assembled position.
Figure 5A:
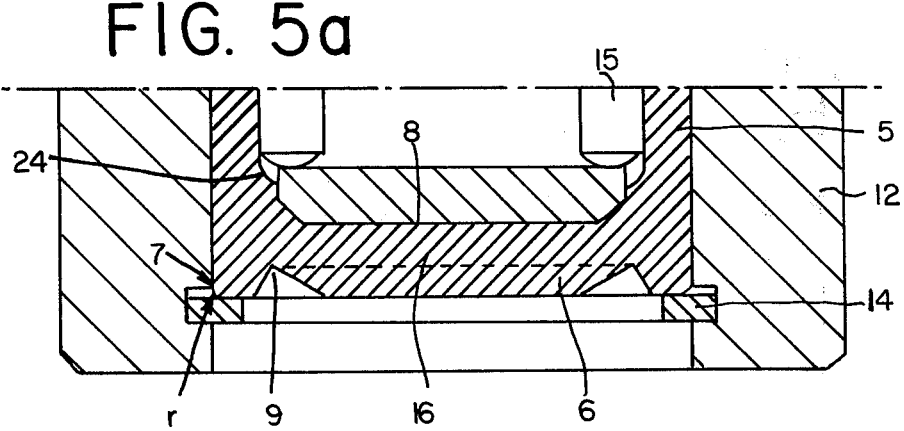
FIG. 5a is a further modification of the present invention.

FIG. 5 shows another modified bearing bushing 23 in accordance with the present invention which is generally similar in overall structural details of the bearing bushing shown in FIG. 2. This bearing bushing has a circumferentially extending groove-shaped recess 9 in the outer face of the bottom section which is located axially opposite the flat planar inside surface of the bottom section. The inside surface 8 is also provided with the fillet having a cross-sectional radius "R" which is preferably larger than the cross-sectional radius "r" of the peripheral rim 7 and which changes over into the bore surface of the sleeve section 5. In the present instance, the sleeve section is stepped as at 24 so that the thickness of the wall near the peripheral wall 7 is reinforced and of a larger cross section than the remainder to absorb high forces in this area. The thrust washer 16 rests on this reinforced wall of the sleeve section 5 with the cylindrical roller bodies 15 laterally running and axially guided against this washer. The pin (broken lines) of the universal joint is supported in the bore of the fork via the roller bodies 15 and the bearing bushing 23. The bearing bushing 23 is axially held in place on the side of its bottom section by the snap ring 14 in the bore of the fork 12.

Even though various embodiments of the invention have been illustrated and described herein, it is not intended to limit the invention and changes and modifications may be made therein within the scope of the following claims.

For example, instead of the fillet with the cross-sectional radius "R" shown in the various embodiments, a beveled annular surface can also be provided by utilizing a drawing ram with a bevel to form the beveled surface. The bevel is selected in such a way that it enhances the displacement of the construction material into the recess of the counter ram 4 which forms the peripheral rim 7. Further, instead of the peripheral rim 7 with a radius "r", it is possible to provide a sharp peripheral rim or a peripheral rim broken by a small chamfer.

What is claimed is:

1. Thin-walled bearing bushing produced in a drawing process for the support of pins in universal joints, consisting of a cylindrical sleeve section and a bottom section of nominal thickness which closes this cylindrical sleeve section on one axial end whereby a peripheral rim with a small cross sectional radius is formed between the outside surface of the sleeve section and the outside surface of the bottom section, and means defining a circumferentially extending groove in the one surface of the bottom section disposed radially inward of the peripheral rim adjacent the juncture of the sleeve and bottom, said groove being deep with respect to the nominal thickness of said bottom and having a sharp profile and axially impressed during drawing in said one surface as to reduce the wall thickness of the bottom section and to displace construction material outward into the area of the peripheral rim between the bottom section and the sleeve section of the bearing bushing, the material in the area of the peripheral rim being uniformly compressed.

2. Bearing bushing according to claim 1, characterized in that the inside surface (8) of the bottom section (6) is provided with a fillet with a cross sectional radius (R) larger than the cross sectional radius (r) of the peripheral rim (7), which changes over into the bore surface of the sleeve section (5).

3. Bearing bushing according to claim 1, characterized in that the transition from the inside surface (8) of the bottom section (6) to the bore surface of the sleeve section (5) is a beveled annular surface.

4. Bearing bushing according to claim 1, characterized in that said one surface of the bottom section (6) axially opposite the recess (9, 18, 22) is constructed as a flat surface.

* * * * *